United States Patent
Wade et al.

(10) Patent No.: US 7,263,984 B2
(45) Date of Patent: Sep. 4, 2007

(54) HEATED PCV VALVE AND HOSE ASSEMBLIES

(75) Inventors: Tim Wade, Rochester Hills, MI (US); Neil P Henige, Gaines, MI (US); Tom White, Bloomfield Hills, MI (US)

(73) Assignee: Cooper Technology Services, LLC, Findlay, OH (US)

( * ) Notice: Subject to any disclaimer, the term of this patent is extended or adjusted under 35 U.S.C. 154(b) by 42 days.

(21) Appl. No.: 10/487,057

(22) PCT Filed: Aug. 29, 2002

(86) PCT No.: PCT/US02/27697

§ 371 (c)(1),
(2), (4) Date: Jun. 22, 2004

(87) PCT Pub. No.: WO03/021087

PCT Pub. Date: Mar. 13, 2003

(65) Prior Publication Data

US 2004/0231651 A1 Nov. 25, 2004

Related U.S. Application Data

(60) Provisional application No. 60/316,009, filed on Aug. 30, 2001.

(51) Int. Cl.
*F02M 31/07* (2006.01)
(52) U.S. Cl. .................................................. 123/572
(58) Field of Classification Search ........ 123/572–574, 123/41.86; 137/341; 219/201, 205, 504
See application file for complete search history.

(56) References Cited

U.S. PATENT DOCUMENTS

| | | | | | |
|---|---|---|---|---|---|
| 5,758,826 | A | * | 6/1998 | Nines | 239/136 |
| 5,970,962 | A | * | 10/1999 | Nelson et al. | 123/573 |
| 6,044,829 | A | * | 4/2000 | Butz et al. | 123/573 |
| 6,102,303 | A | * | 8/2000 | Bright et al. | 239/135 |
| 6,478,043 | B2 | * | 11/2002 | Ishigaki | 137/341 |
| 6,546,921 | B1 | * | 4/2003 | Callahan | 123/573 |

* cited by examiner

*Primary Examiner*—Marguerite McMahon
(74) *Attorney, Agent, or Firm*—Carlson, Gaskey & Olds, PC (57) ABSTRACT

A PCV valve assembly including housing having a fluid inlet and outlet. A poppet valve is disposed in the housing between the fluid inlet and outlet and is moveable in an axial direction between a plurality of positions. A heating element having a positive temperature coefficient material is supported in the housing in proximity to at least a portion of the valve for automatically heating the valve in response to a given voltage. The material produces a first heat in response to a first temperature and the given voltage. The material produces a second heat less than the first heat produced in response to the given voltage and a second temperature greater than the first temperature. That is, the positive temperature coefficient material automatically regulates the flow of current and the temperature produced without the need of a thermostat in response to the same voltage. A hose may also be used defining an air passageway and having a length is connected between the fluid outlet and an intake manifold respectively at first and second connections. The hose has a heating element arranged substantially along the length for applying heat to the bare passageway. An electrical device is connected to the heating element for providing power to the heating element to generate heat. In this manner, air entering the intake manifold in proximity to the throttle blade is heated to maintain a higher temperature to prevent blade icing.

25 Claims, 5 Drawing Sheets

HEATED PCV VALVE AND HOSE ASSEMBLIES

This application is the National Stage of PCT Application Number PCT/US02/27697 filed on Aug. 29, 2002, which claims priority to U.S. Provisional Patent No. 60/316,009 filed on Aug. 30, 2001.

BACKGROUND OF THE INVENTION

This invention relates to heating components of a combustion engine ventilation system, and more particularly, the invention relates to a heating element for use with a positive crankcase ventilation valve and a heating element for use with a hose from the PCV valve to the intake manifold.

PCV valve assemblies are used to vent unburned combustion gases, which blow by the piston rings and into the engine crankcase into the intake manifold to be burned. Relief of pressure within the crankcase and burning the unburned combustion gases are critical in obtaining desirable engine operation and emissions. Numerous PCV valve actuation devices for opening and closing the valve have been proposed, some of which do not provide valve control to the degree desired. In particular, PCV valve operation may be negatively affected by the temperature. Under some cold conditions, the operation of the PCV valve may be inhibited and the valve may be unusable. That is, the gases in the vicinity PCV valve may freeze thereby preventing the valve from moving. PCV valve assembly heating devices have been used to heat the assembly to better ensure desirable operation. However, they have employed external thermostats to control the flow of current to the heating device to turn the heating device on at the desired temperature. The thermostats add cost to the PCV valve and take up space in the engine compartment. Therefore, what is needed is an improved heating device for a PCV valve assembly.

The PCV valve is typically mounted on a rocker arm cover and connected to the intake manifold by a hose. The hose connection at the intake manifold may be located upstream of the throttle body blade. Cold moist air hitting the throttle body blade may produce ice around the throttle body causing the throttle blade to stick. It is desirable to heat the air entering the intake manifold near the throttle body blade to a temperature sufficiently high to prevent icing of the blade. Therefore, what is needed is a heating device for use with the combustion engine ventilation system to prevent icing of the blade.

SUMMARY OF THE INVENTION AND ADVANTAGES

The present invention provides a PCV valve assembly including housing having a fluid inlet and outlet. A poppet valve is disposed in the housing between the fluid inlet and outlet and is moveable in an axial direction between a plurality of positions. A heating element having a positive temperature coefficient material is supported in the housing in proximity to at least a portion of the valve for automatically heating the valve in response to a given voltage. The material produces a first heat in response to a first temperature and a the given voltage. The material produces a second heat less than the first heat produced in response to the given voltage and a second temperature greater than the first temperature. That is, the positive temperature coefficient material automatically regulates the flow of current and the temperature produced without the need of a thermostat in response to the same voltage.

The combustion engine ventilation system may also include a positive crankcase ventilation valve housing having a fluid inlet and outlet with a valve assembly arranged in the housing and moveable between a plurality of positions. A hose defining an air passageway and having a length is connected between the fluid outlet and an intake manifold respectively at first and second connections. The hose has a heating element arranged substantially along the length for applying heat to the air passageway. An electrical device is connected to the heating element for providing power to the heating element to generate heat. In this manner, air entering the intake manifold in proximity to the throttle blade is heated to maintain a higher temperature to prevent blade icing.

Accordingly, the above invention provides an improved combustion engine ventilation system including an improved PCV valve.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
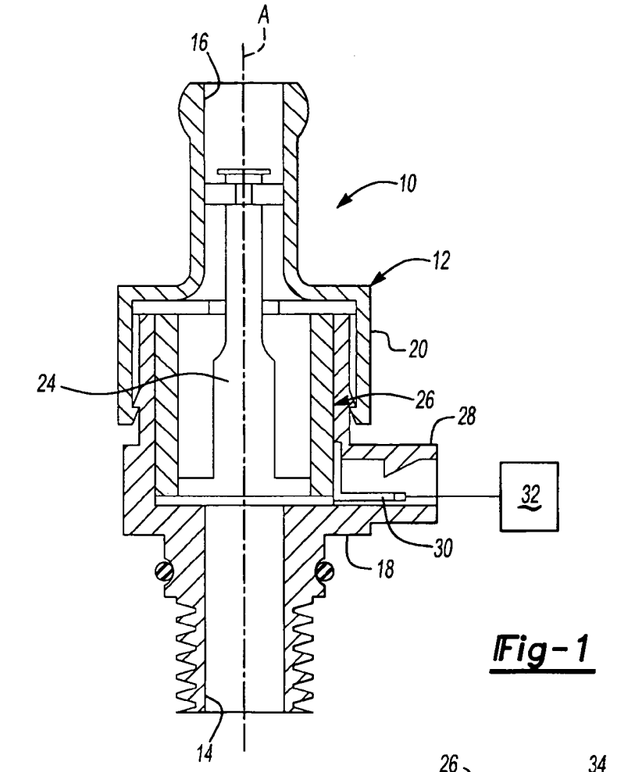
FIG. 1 is a cross-sectional view of the present invention PCV valve.

A PCV valve assembly 10 is shown in FIG. 1. The PCV valve assembly 10 is part of a combustion engine ventilation system that regulates the flow of gases from the engine back to the intake manifold. The assembly 10 includes a housing 12 having fluid inlet 14 and fluid outlets 16. The housing 12 is presently constructed from first 18 and second 20 housing portions secured to one another to facilitate the assembly of the valve assembly 10. A poppet valve 24 is located within the housing 12 between the inlet 14 and outlet 16 and is moveable along an axial direction A. The poppet valve 24 regulates the flow of gases through the assembly 10. It is to be understood other valve configuration may be used.

The valve 24 may become stuck within the housing in an undesired position during cold conditions. To this end, the assembly 10 includes a heating element 26 that automatically varies the amount of heat generated in response to the surrounding temperature. In this manner, the appropriate amount of heating may be applied to the PCV valve without an additional circuit for turning the valve on and off. A connector 28 extends from a portion of the housing 12 to receive power from a control device 32 that provides the needed current to the heating element 26. The connector 28 has electrical contacts 30 that supplies the current to the heating element 26.

Figure 2:
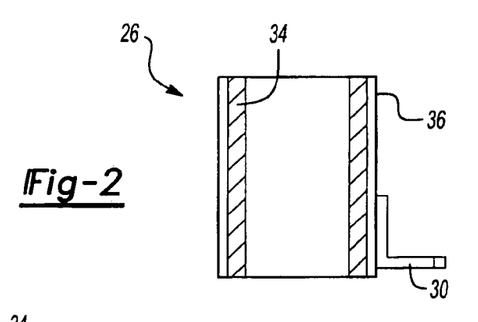
FIG. 2 is a cross-sectional view of the heating element shown in FIG. 1.
Figure 3:
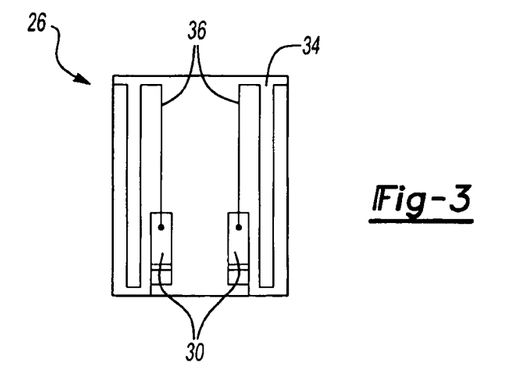
FIG. 3 is a side elevational view of the heating element shown in FIG. 2.

The heating element 26 may include a tubular member 34, preferably constructed from aluminum, that at least partially surrounds the poppet valve 24 for heating the area around the poppet valve to prevent the valve 24 from sticking to the housing 12. A foil 36 constructed from a positive temperature coefficient material is attached to the tubular member 34 and generates heat in response to current applied to the electrical contacts 30. The positive temperature coefficient or PTC material is known in the art and is constructed from a semiconductor material that exhibits characteristics similar to a thermister. The material is sandwiched between two layers of film similar to a strain gauge and is adhered to the surface of the tubular member 34. As shown in FIG. 3, the material of the foil 36 may coil or wind back and forth around the circumference of the tubular member 34.

For a given voltage applied to the foil 36, a current is produced in the foil that generates heat. However, the current flowing to the foil 36, and thus the heat generated by the foil, varies based upon the temperature surrounding the foil 36. The lower the temperature on the heating element 26, the more current that goes through the foil 36, thereby providing heat to the PCV valve 10. As the temperature rises about the foil 36, less current passes through the foil 36, thereby providing less heat to the PCV valve in response to the same voltage. In this manner, the heating element 26 is self-regulating and provides a desired amount of heat to the valve assembly 10 through a range of temperature conditions in response to the same voltage. Of course, the voltage to the heating element 26 may be varied.

Figures 4, 4A:
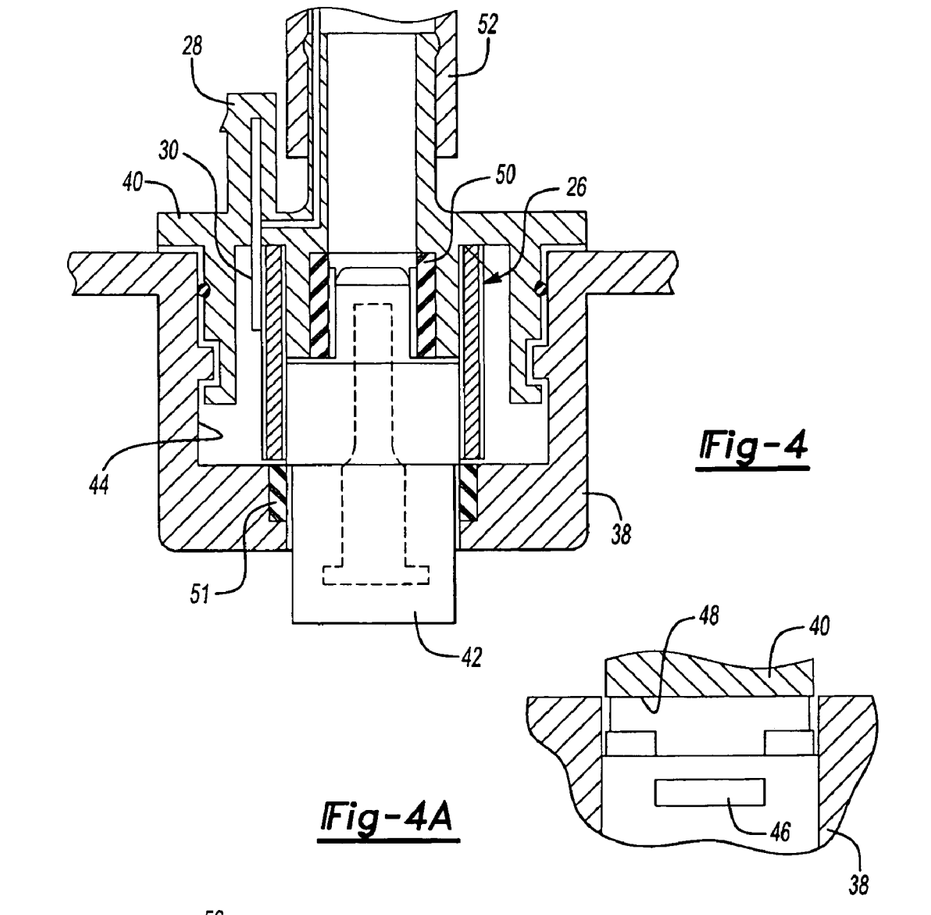
FIG. 4 is a cross-sectional view of another PCV valve arrangement utilizing the heating elements shown in FIG. 3.
FIG. 4A is a side elevational view of the cammed surfaces shown in FIG. 4.

Another embodiment of the heating element 26 is shown in FIGS. 4 and 4A. A valve cover 38 has a hole 44 receiving a secondary housing 42, which contains the PCV valve assembly. A housing portion 40 or cap is secured to the valve cover 38 about the secondary housing 42. The valve cover 38 and housing portion 40 may have complimentary cammed surfaces 46 and 48 that cooperate with one another to removably secure the housing portion 40 to the valve cover 38. The first cammed surface 46 may be a protrusion extending from the valve cover 38 and hole 44, and the second cammed surface 48 may include a slot in the housing portion 40. The housing portion 40 is inserted axially into the hole 44 so that the first cam surface 46 is received in the slot and the second cam surface 48 and then rotated about the axis.

The housing portion 40 and valve cover 38 may respectively include seals 50 and 51 that seal about the secondary housing 42. The heating element 26 may be arranged about the secondary housing 42 to heat the poppet valve located within. A hose 52 is secured to an end of the housing portion 40 to carry gases from the valve cover 38 to the intake manifold, as is known in the art.

Figure 5:
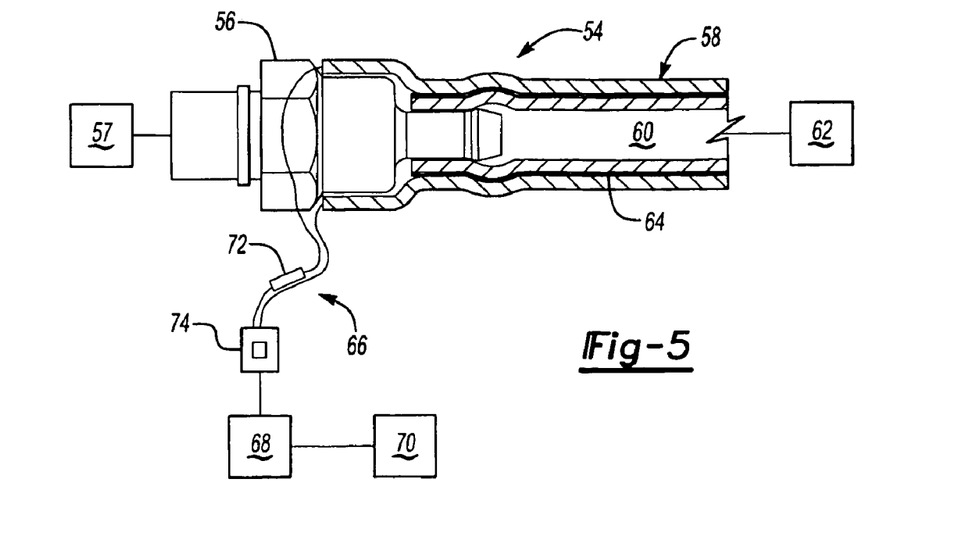
FIG. 5 is a schematic and cross-sectional view of a combustion engine ventilation system of the present invention.

A combustion engine ventilation system is shown schematically at 54 in FIG. 5. A PCV valve 56 is typically mounted on a valve cover 57. A hose 58 is connected to the PCV valve 56 at a first connection and is secured to an intake manifold 62 at a second connection to carry gases from the valve cover 57 to the intake manifold 62 via an air passageway 60. To maintain a high enough temperature to prevent the throttle blade in the intake manifold 62 from icing, a heating element 64 is employed in the hose 58. The hose 58 may cover a portion of the PCV valve 56 to heat the valve within to prevent the poppet valve from sticking within the PCV valve 56. An electrical device 66 is connected to the heating element 64 to provide power and control of the heating element 64. The electrical device 66 may include a thermostat 72 sensing the temperature in the area of the ventilation system 54 and a controller 68 and power source 70 providing power to the heating elements 64 through an electrical connector 74 in a desired manner.

Figure 6:
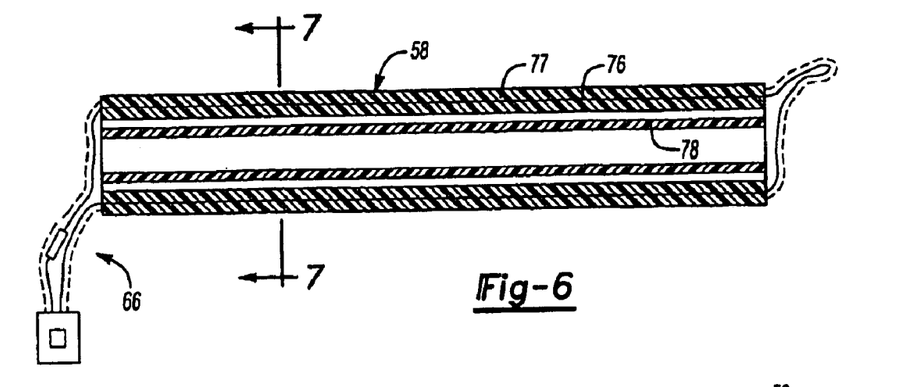
FIG. 6 is a cross-sectional view of the hose shown in FIG. 5.
Figure 6A:
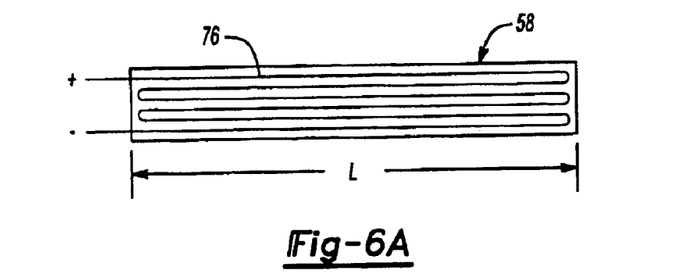
FIG. 6A is a elevational view of the heating element arrangement arranged on the hose shown in FIG. 6.
Figure 7:
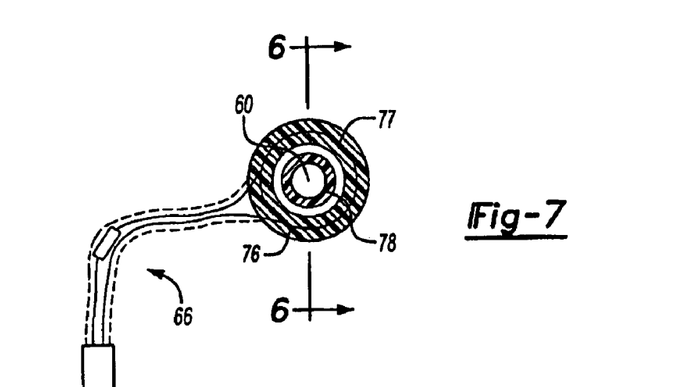
FIG. 7 is a cross-sectional view of the hose shown in FIG. 6 taken along line 7-7.

As been shown in FIGS. 6, 6A and 7, the heating element 64 may include a wire 76 of the type known in the art extending back and forth along the length L of the hose 58. The wire 76 may be located between first 77 and second 78 layers. A voltage is applied to the heating element 64 to heat the air within the air passageway 60 as it is carried to the intake manifold 62.

Figure 8:
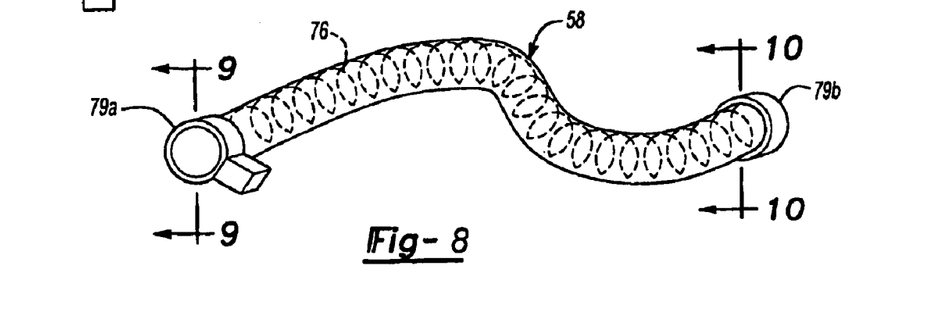
FIG. 8 is a perspective view of another hose with the present heating element.
Figure 8A:
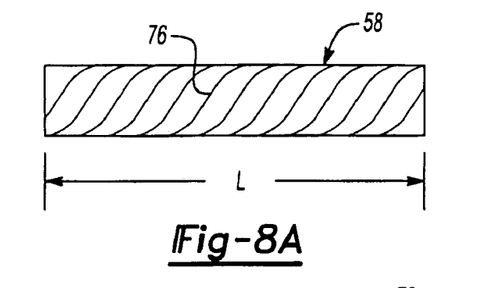
FIG. 8A is a top elevational view of the heating element on the hose shown in FIG. 8.
Figure 9:
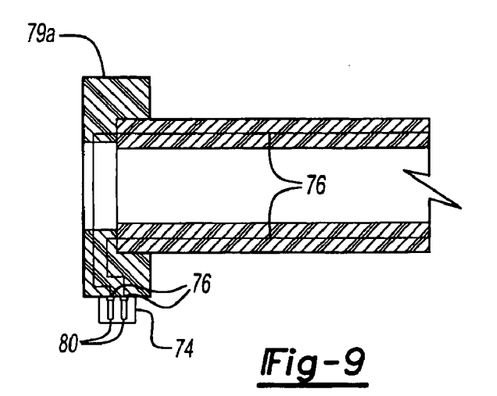
FIG. 9 is a cross-sectional view of a first end cap shown in FIG. 8 taken along line 9-9.
Figure 10:
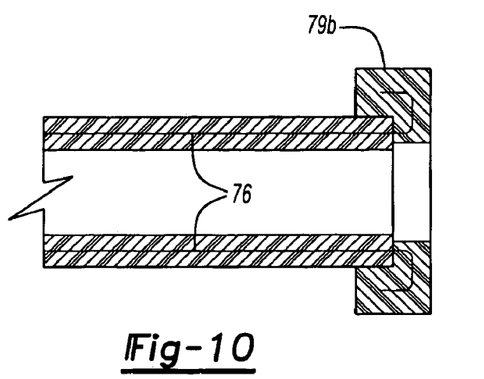
FIG. 10 is a cross-sectional view of a second end cap shown in FIG. 8 taken along line 10-10.

Referring to FIGS. 8 and 8A, alternatively the wire 76 may wrap about the hose 58 along the length L. A voltage must be applied across each end of the wire 76. As a result, it may be necessary to employ caps 79a and 79b to connect the wires exiting at the ends of the hose 58 to ensure a continuous loop of wire to which voltage may be applied. The caps 79a and 79b may be constructed from a plastic material and used to connect the loose ends of the wires at the end so that they are protected. As shown in FIG. 9, an electrical connector 74 may be provided on the cap 79a so that a voltage may be applied to the electrical contacts 80.

Figure 11:
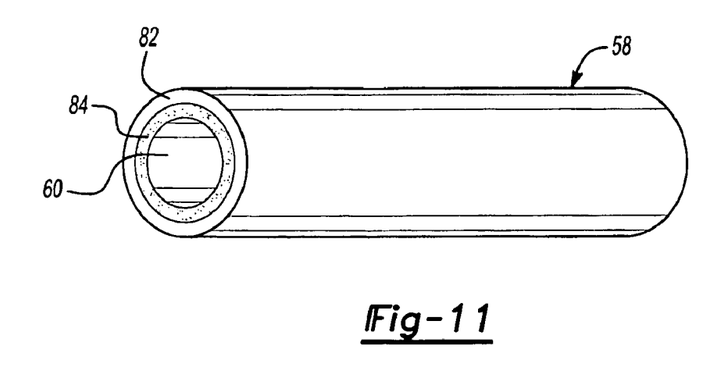
FIG. 11 is a perspective view of another hose and heating element.
Figure 12:
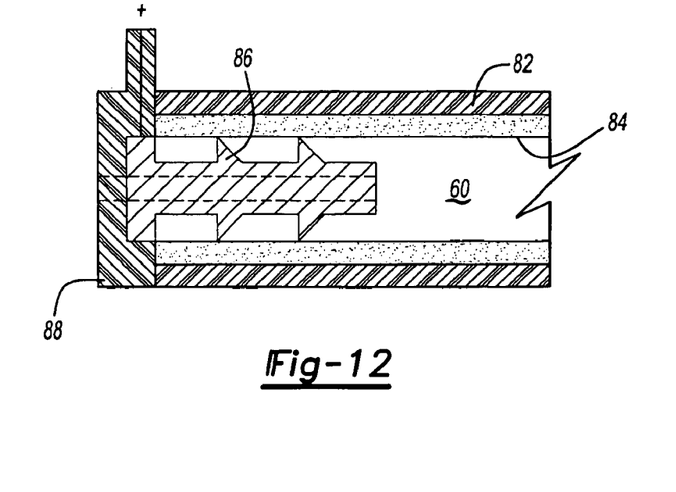
FIG. 12 is a cross-sectional view of the hose in FIG. 11 with an end cap.

Referring to FIGS. 11 and 12, the hose 58 may be constructed from a non-conductive outer layer 82 and a conductive inner layer 84. Voltage may be applied to the conductive inner layer 84 by a cap that has a conductive barb 86 that engages the conductive layer 84. The conductive barb 86 is insulated by a non-conductive portion 88 that provides the connector. The conductive layer 84 is capable of generating sufficient heat in response to a voltage while remaining secured to the outer layer 82.

Figure 13:
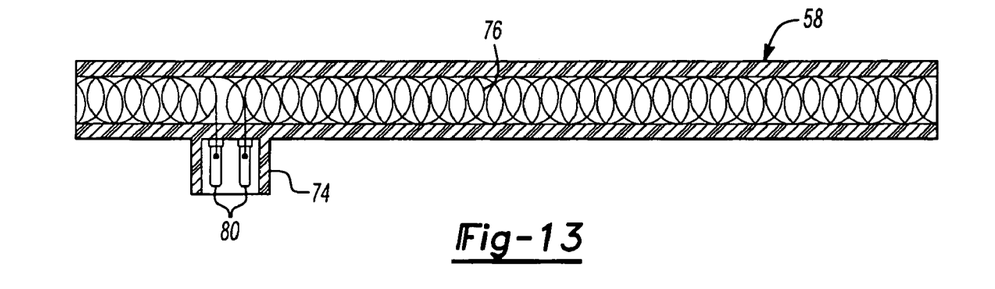
FIG. 13 is a cross-sectional view of another hose and heating element.
Figure 14:
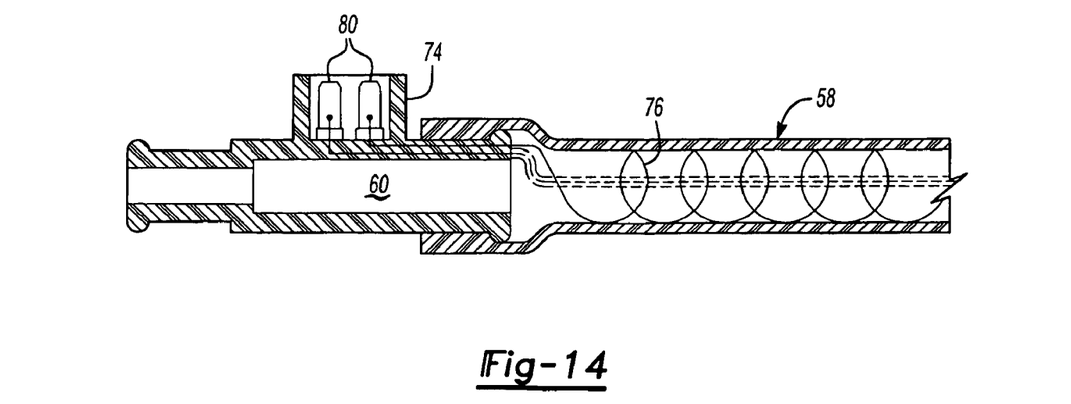
FIG. 14 is a cross-sectional view of yet another hose and heating element.

An additional connector configuration is shown at FIGS. 13 and 14. The connector 74 may extend transversely from the hose 58 to provide a more convenient connection for supplying voltage to the wires 76 via electrical contacts 80. Alternatively, as shown in FIG. 14 the connector 74 may be attached to the end of the hose 54 and provide a portion of the air passageway 60. The wire 76 may be wrapped about the interior of the hose 58 and exposed to the air passageway 60 for improved heat transfer from the wire 76 to the air in the passageway 60.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

The invention claimed is:

1. A positive crankcase ventilation valve assembly comprising:
   a housing having a fluid inlet, a fluid outlet and an intermediate portion between the fluid inlet and the fluid outlet;
   a poppet valve disposed in said housing between said fluid inlet and said fluid outlet and movable in an axial direction between a plurality of positions; and
   a tubular heating element arranged about at least a portion of the value, and having a positive temperature coefficient material within said intermediate portion that is supported by said housing in proximity to at least a portion of said valve for automatically heating said valve in response to a given voltage, said positive temperature coefficient material producing a first heat in response to a first temperature and said given voltage and producing a second heat in response to a second temperature and said given voltage, wherein said second heat is less than said first heat and said second temperature is greater than said first temperature.

2. The assembly according to claim 1, wherein said heating element includes a tubular member and said positive temperature coefficient material is provided by a foil secured to said tubular member.

3. The assembly according to claim 2, wherein said tubular member is constructed from aluminum.

4. The assembly according to claim 1, further including a connector extending from said housing, and an electrical contact extends from said heating element into said connector.

5. The assembly according to claim 1, wherein said housing includes a first housing portion and a second housing portion secured about said valve, wherein said heating element is supported by one of said first housing portion and said second housing portion.

6. The assembly according to claim 5, wherein said first housing portion is a valve cover and said second housing portion is a cap supporting said heating element and removably secured to said valve cover.

7. The assembly according to claim 6, wherein said valve cover includes a hole with a first cammed surface and said cap includes a second cammed surface that coacts with said first cammed surface to secure said cap to said valve cover.

8. The assembly according to claim 5, wherein said valve is contained in a secondary housing retained between said first housing portion and said second housing portion, wherein said heating element is arranged about at least a portion of said secondary housing.

9. The assembly according to claim 1, wherein said positive temperature coefficient material is a wire.

10. The assembly as recited in claim 1, wherein said positive temperature coefficient material is a loop that extends between terminal ends of said heating element.

11. The assembly as recited in claim 10, wherein said loop comprises a first loop section and a second loop section that extends parallel to said first loop section and to said axial direction.

12. The assembly as recited in claim 10, wherein said loop is disposed on a curved surface.

13. The assembly as recited in claim 10, wherein said terminal ends are disposed on a curved surface.

14. A positive crankcase ventilation valve assembly comprising:
   a housing having a fluid inlet, a fluid outlet and an intermediate portion between the fluid inlet and the fluid outlet;
   a poppet valve disposed in said housing between said fluid inlet and said fluid outlet and movable in an axial direction between a plurality of positions; and
   a heating element within said intermediate portion arranged about to at least a portion of said valve for heating said valve.

15. The assembly according to claim 14, wherein said tubular memberis constructed from aluminum as recited in claim 16, wherein said resistance element is disposed on a curved surface.

16. The assembly according to claim 14, further including a connector extending from said housing, and an electrical contact extends from said heating element into said connector.

17. The assembly according to claim 14, wherein said housing includes a first housing portion and a second housing portion secured about said valve, wherein said heating element is supported by one of said first housing portion and said second housing portion. tubular member is constructed from aluminum.

18. The assembly according to claim 17, wherein said first housing portion is a valve cover and said second housing portion is a cap supporting said heating element and removably secured to said valve cover.

19. The assembly according to claim 18, wherein said valve cover housing includes a first housing portion and a second housing portion secured about said valve, wherein said heating element is supported by one of said first housing portion and said second housing portion.

20. The assembly according to claim 19, wherein said first housing portion is a valve cover and said second housing portion is a cap supporting said heating element and removably secured to said valve cover.

21. The assembly according to claim 20, wherein said valve cover includes a hole with a first cammed surface and said cap includes a second cammed surface that coacts with said first cammed surface to secure said cap to said valve cover.

22. The assembly according to claim 19, wherein said valve is contained in a secondary housing retained between said first housing portion and said second housing portion, wherein said heating element is arranged about at least a portion of said secondary housing.

23. The assembly according to claim 16, wherein said heating element is supported by said housing.

24. A positive crankcase ventilation valve assembly comprising:
   a housing having a fluid inlet and a fluid outlet;
   a poppet valve disposed in said housing between said fluid inlet and said fluid outlet and movable in an axial direction between a plurality of positions; and
   a tubular heating element that extends at least partially about a portion of said valve for heating said valve.

25. The assembly as recited in claim 24, wherein said heating element comprises a positive temperature coefficient material that produces a first heat in response to a first temperature and a given voltage and produces a second heat in response to a second temperature and said given voltage, wherein said second heat is less than said first heat and said second temperature is greater than said first temperature.

* * * * *

UNITED STATES PATENT AND TRADEMARK OFFICE
CERTIFICATE OF CORRECTION

PATENT NO. : 7,263,984 B2
APPLICATION NO. : 10/487057
DATED : September 4, 2007
INVENTOR(S) : Wade et al.

It is certified that error appears in the above-identified patent and that said Letters Patent is hereby corrected as shown below:

Claim 15, Column 6, lines 11-13: delete "as recited in claim 16, wherein said resistance element is disposed on a curved surface"

Claim 17, Column 6, lines 22-23: delete "tubular member is constructed from aluminum"

Signed and Sealed this

Twenty-ninth Day of April, 2008

JON W. DUDAS
*Director of the United States Patent and Trademark Office*

(12) EX PARTE REEXAMINATION CERTIFICATE (9293rd)
United States Patent
Wade et al.

(10) Patent Number: US 7,263,984 C1
(45) Certificate Issued: *Sep. 11, 2012

(54) HEATED PCV VALVE AND HOSE ASSEMBLIES

(75) Inventors: Tim Wade, Rochester Hills, MI (US); Neil P Henige, Gaines, MI (US); Tom White, Bloomfield Hills, MI (US)

(73) Assignee: Cooper-Standard Automotive Inc., Novi, MI (US)

Reexamination Request:
No. 90/010,797, Jan. 21, 2010

Reexamination Certificate for:
Patent No.: 7,263,984
Issued: Sep. 4, 2007
Appl. No.: 10/487,057
Filed: Jun. 22, 2004

(*) Notice: This patent is subject to a terminal disclaimer.

Certificate of Correction issued Apr. 29, 2008.

(22) PCT Filed: Aug. 29, 2002
(86) PCT No.: PCT/US02/27697
§ 371 (c)(1),
(2), (4) Date: Jun. 22, 2004
(87) PCT Pub. No.: WO03/021087
PCT Pub. Date: Mar. 13, 2003

Related U.S. Application Data
(60) Provisional application No. 60/316,009, filed on Aug. 30, 2001.

(51) Int. Cl.
*F02M 31/07* (2006.01)

(52) U.S. Cl. .................................................. 123/572
(58) Field of Classification Search .................. None
See application file for complete search history.

(56) References Cited

To view the complete listing of prior art documents cited during the proceeding for Reexamination Control Number 90/010,797, please refer to the USPTO's public Patent Application Information Retrieval (PAIR) system under the Display References tab.

*Primary Examiner* — Peter C. English (57) ABSTRACT

A PCV valve assembly including housing having a fluid inlet and outlet. A poppet valve is disposed in the housing between the fluid inlet and outlet and is moveable in an axial direction between a plurality of positions. A heating element having a positive temperature coefficient material is supported in the housing in proximity to at least a portion of the valve for automatically heating the valve in response to a given voltage. The material produces a first heat in response to a first temperature and the given voltage. The material produces a second heat less than the first heat produced in response to the given voltage and a second temperature greater than the first temperature. That is, the positive temperature coefficient material automatically regulates the flow of current and the temperature produced without the need of a thermostat in response to the same voltage. A hose may also be used defining an air passageway and having a length is connected between the fluid outlet and an intake manifold respectively at first and second connections. The hose has a heating element arranged substantially along the length for applying heat to the bare passageway. An electrical device is connected to the heating element for providing power to the heating element to generate heat. In this manner, air entering the intake manifold in proximity to the throttle blade is heated to maintain a higher temperature to prevent blade icing.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, line 64-column 3, line 8:

A PCV valve assembly 10 is shown in FIG. 1. The PCV valve assembly 10 is part of a combustion engine ventilation system that regulates the flow of gases from the engine back to the intake manifold. The assembly 10 includes a housing 12 having fluid inlet 14 and fluid outlets 16. The housing 12 is presently constructed from first 18 and second 20 housing portions secured to one another to facilitate the assembly of the valve assembly 10. A poppet valve 24 is located within the housing 12 between the inlet 14 and outlet 16 and is moveable along an axial direction A. *The poppet valve 24 is pressure-actuated.* The poppet valve 24 regulates the flow of gases through the assembly 10. It is to be understood other valve configuration may be used.

AS A RESULT OF REEXAMINATION, IT HAS BEEN DETERMINED THAT:

The patentability of claims 2, 3 and 9-13 is confirmed.

Claims 1, 4-7, 14-21 and 23-25 are cancelled.

Claims 8 and 22 were not reexamined.

\* \* \* \* \*